US012367993B2

(12) United States Patent
DeBerry et al.

(10) Patent No.: US 12,367,993 B2
(45) Date of Patent: Jul. 22, 2025

(54) POSITIVE TEMPERATURE COEFFICIENT COMPONENT

(71) Applicant: PPG Industries Ohio, Inc., Cleveland, OH (US)

(72) Inventors: Shawn R. DeBerry, Cranberry Township, PA (US); Thomas E. Decker, Pittsburgh, PA (US); David W. Posey, Jr., Apollo, PA (US); Michelle A. Andrykovitch, Irwin, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 339 days.

(21) Appl. No.: 17/998,264

(22) PCT Filed: May 11, 2021

(86) PCT No.: PCT/US2021/031792
§ 371 (c)(1),
(2) Date: Nov. 9, 2022

(87) PCT Pub. No.: WO2021/231435
PCT Pub. Date: Nov. 18, 2021

(65) Prior Publication Data

US 2023/0223174 A1 Jul. 13, 2023

Related U.S. Application Data

(60) Provisional application No. 63/023,338, filed on May 12, 2020.

(51) Int. Cl.
*H01C 7/02* (2006.01)
*H01C 7/13* (2006.01)
(Continued)

(52) U.S. Cl.
CPC ............. *H01C 7/021* (2013.01); *H01C 7/027* (2013.01); *H01C 7/13* (2013.01);
(Continued)

(58) Field of Classification Search
CPC ... H01C 7/027; H01C 7/021; H01C 17/06506
See application file for complete search history.

(56) References Cited

U.S. PATENT DOCUMENTS 4,628,187 A * 12/1986 Sekiguchi .............. H05B 3/267 219/505
5,174,924 A * 12/1992 Yamada .................. H01B 1/24 524/495

(Continued)

FOREIGN PATENT DOCUMENTS

EP 0172302 A1 2/1986
EP 0460790 A1 12/1991

(Continued)

OTHER PUBLICATIONS

CN105549442 machine translation (Year: 2016).*

(Continued)

*Primary Examiner* — Kyung S Lee
(74) *Attorney, Agent, or Firm* — Krisanne Shideler

(57) ABSTRACT

A positive temperature coefficient component includes: a substrate (32); a conductive ink (36) disposed over at least a portion of the substrate (32); a positive temperature coefficient layer (38) disposed over at least a portion of the substrate (32) and/or the conductive ink (36); and a topcoat layer (42) formed from a coating composition including a dielectric material disposed over at least a portion of the positive temperature coefficient layer (38) and/or the conductive ink (36).

17 Claims, 4 Drawing Sheets

(51) Int. Cl.

| | |
|---|---|
| ***H01C 17/065*** | (2006.01) |
| ***H05B 3/14*** | (2006.01) |
| ***H05B 3/22*** | (2006.01) |

(52) U.S. Cl.

CPC ....... *H01C 17/06506* (2013.01); *H05B 3/146* (2013.01); *H05B 3/22* (2013.01); *H05B 2203/013* (2013.01); *H05B 2203/02* (2013.01)

(56) References Cited

U.S. PATENT DOCUMENTS

| | | | | |
|---|---|---|---|---|
| 7,049,559 | B2 * | 5/2006 | Ishii | H01C 1/01<br>219/545 |
| 2018/0094434 | A1 * | 4/2018 | Gillissen | F24D 13/02 |

FOREIGN PATENT DOCUMENTS

| | | | |
|---|---|---|---|
| EP | 1544869 | A1 | 6/2005 |
| EP | 3106762 | A1 | 12/2016 |
| JP | S63265401 | A | 11/1988 |

OTHER PUBLICATIONS

International Search Report and Written Opinion received for PCT Application Serial No. PCT/US2021/031792 dated Sep. 10, 2021, 13 pages.

* cited by examiner

POSITIVE TEMPERATURE COEFFICIENT COMPONENT

FIELD OF THE INVENTION

The present invention relates to positive temperature coefficient component, a method of preparing a positive temperature coefficient component, and a method for self-regulating a temperature of a component.

BACKGROUND OF THE INVENTION

Positive temperature coefficient (PTC) materials can exhibit an increase in electrical resistance as temperature of the material increases. This property makes positive temperature coefficient materials suitable for certain end uses, such as heating elements and/or overcurrent protection elements. Positive temperature coefficient materials can be useful in certain situations such as when a conventional controller component fails to disable heating at a desired temperature, the temperature created by the heating system can automatically be safely self-managed by a positive temperature coefficient material due to its property of increased electrical resistance at certain temperatures.

However, while components including positive temperature coefficient materials may be useful in thermal and/or overcurrent management cases, a positive temperature coefficient material, and the circuit formed thereby, is susceptible to damage in the course of everyday use.

SUMMARY OF THE INVENTION

The present invention is directed to a positive temperature coefficient component including: a substrate; a conductive ink disposed over at least a portion of the substrate; a positive temperature coefficient layer disposed over at least a portion of the substrate and/or the conductive ink; and a topcoat layer formed from a coating composition including a dielectric material disposed over at least a portion of the positive temperature coefficient layer and/or the conductive ink.

The present invention is also directed to a method for self-regulating a temperature of a component, including: causing an electrical current to be applied to a positive temperature coefficient component including: a substrate; a conductive ink disposed over at least a portion of the substrate; a positive temperature coefficient layer disposed over at least a portion of the substrate and/or the conductive ink; and a topcoat layer formed from a coating composition including a dielectric material disposed over at least a portion of the positive temperature coefficient layer and/or the conductive ink.

The present invention is also directed to a method of preparing a positive temperature coefficient component, including: applying a coating composition including a dielectric material over at least a portion of a coated substrate to form a topcoat layer, the coated substrate including: a conductive ink disposed over at least a portion of a substrate; and a positive temperature coefficient layer disposed over at least a portion of the substrate and/or the conductive ink.

DESCRIPTION OF THE INVENTION

Figure 1:
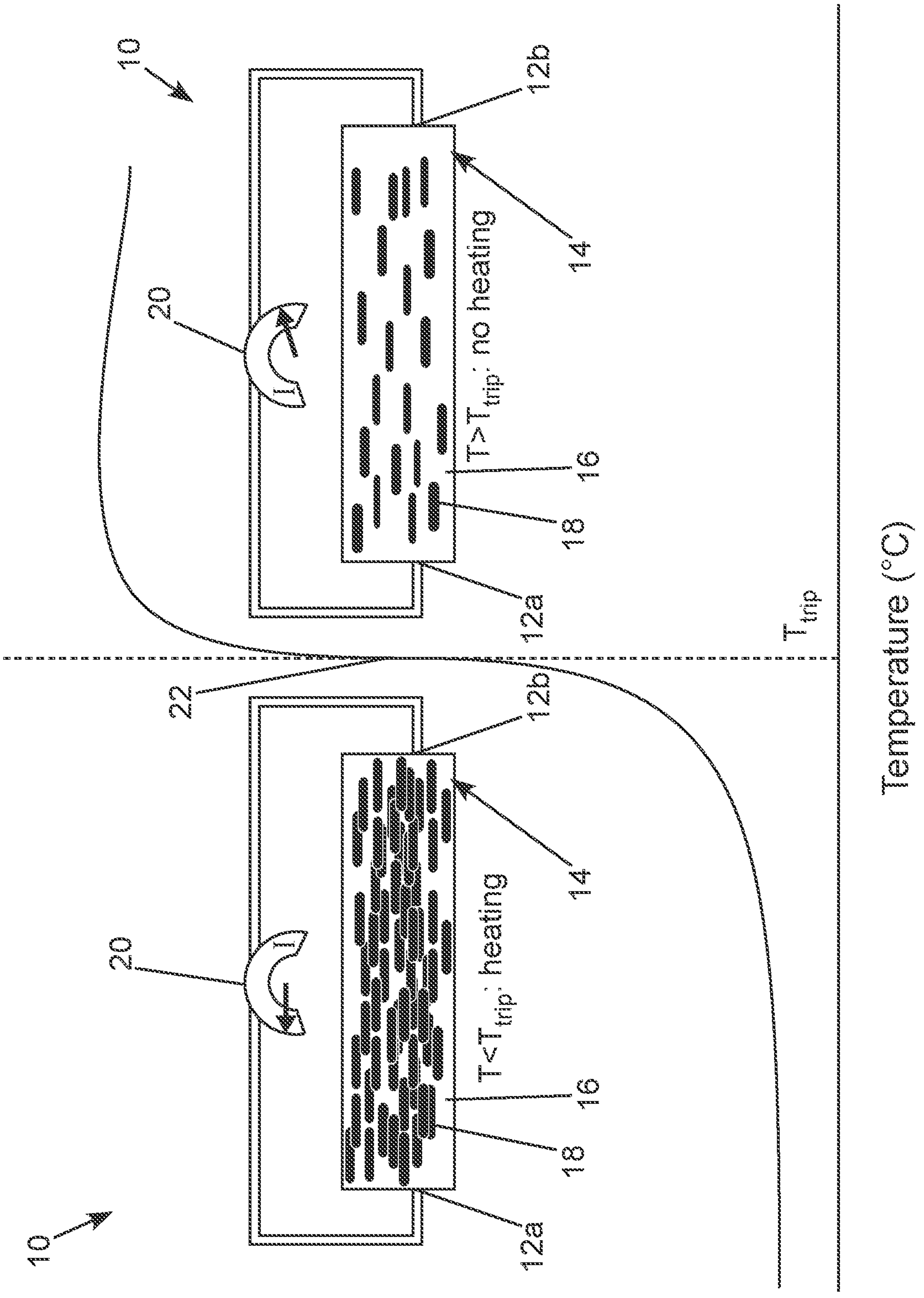
FIG. 1 shows a schematic view of a positive temperature coefficient component comprising an electrically and/or thermally conductive composition.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term “about”. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of “1 to 10” is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of “or” means “and/or” unless specifically stated otherwise, even though “and/or” may be explicitly used in certain instances. Further, in this application, the use of “a” or “an” means “at least one” unless specifically stated otherwise. For example, “a” conductive composition, “a” dielectric material, and the like refer to one or more of any of these items. Also, as used herein, the term “polymer” is meant to refer to prepolymers, oligomers, and both homopolymers and copolymers. The term “resin” is used interchangeably with “polymer”.

As used herein, the transitional term “comprising” (and other comparable terms, e.g., “containing” and “including”) is “open-ended” and open to the inclusion of unspecified matter. Although described in terms of “comprising”, the terms “consisting essentially of” and “consisting of” are also within the scope of the invention.

The term "cured" refers to the process by which a coating composition hardens to form a coating by undergoing a crosslinking reaction either with itself or with a crosslinking agent. The term "UV cured" refers to the process by which the coating composition undergoes a crosslinking reaction initiated by photoinitiation caused by UV radiation. The photoinitiated crosslinking reaction may be a free radical polymerization crosslinking reaction in which the coating composition comprises a photoinitiator.

The present invention is directed to a positive temperature coefficient component, comprising: a substrate; a conductive ink disposed over at least a portion of the substrate; a positive temperature coefficient layer disposed over at least a portion of the substrate and/or the conductive ink; and a topcoat layer formed from a coating composition comprising a dielectric material disposed over at least a portion of the positive temperature coefficient layer and/or the conductive ink.

The positive temperature coefficient component may include a substrate. The substrate may be made of any suitable material. The substrate may be, for example, metallic or non-metallic. The substrate may include tin, aluminum, steel, such as, tin-plated steel, chromium passivated steel, galvanized steel, or coiled steel, or other coiled metal, and any metallic alloys thereof. Examples of suitable materials for the substrate include organic materials, inorganic materials, and hybrid organic-inorganic materials. The substrate may include a thermoplastic polymer, a thermoset polymer, an elastomer, or a co-polymer or other combination thereof, such as selected from polyolefins (e.g., polyethylene (or PE), polypropylene (or PP), polybutene, and polyisobutene), acrylate polymers (e.g., poly(methyl methacrylate) (or PMMA) type 1 and type 2), polymers based on cyclic olefins (e.g., cyclic olefin polymers (or COPs) and co-polymers (or COCs), such as available under the trademark ARTON™ and ZEONORFILM®), aromatic polymers (e.g., polystyrene), polycarbonate (or PC), ethylene vinyl acetate (or EVA), ionomers, polyvinyl butyral (or PVB), polyesters, polysulphones, polyamides, polyimides, polyurethanes, vinyl polymers (e.g., polyvinyl chloride (or PVC)), fluoropolymers, polylactic acid, polymers based on allyl diglycol carbonate, nitrile-based polymers, acrylonitrile butadiene styrene (or ABS), cellulose triacetate (or TAC), phenoxy-based polymers, phenylene ether/oxide, a plastisol, an organosol, a plastarch material, a polyacetal, aromatic polyamides, polyamide-imide, polyarylether, polyetherimide, polyarylsulfones, polybutylene, polyketone, polymethylpentene, polyphenylene, polymers based on styrene maleic anhydride, polymers based on polyallyl diglycol carbonate monomer, bismaleimide-based polymers, polyallyl phthalate, thermoplastic polyurethane, high density polyethylene, low density polyethylene, copolyesters (e.g., available under the trademark TRITAN™), polyethylene terephthalate glycol (or PETG), polyethylene terephthalate (or PET), epoxy, epoxy-containing resin, melamine-based polymers, silicone and other silicon-containing polymers (e.g., polysilanes and polysilsesquioxanes), polymers based on acetates, poly(propylene fumarate), poly(vinylidene fluoride-trifluoroethylene), poly-3-hydroxybutyrate polyesters, polycaprolactone, polyglycolic acid (or PGA), polyglycolide, polyphenylene vinylene, electrically conductive polymers, liquid crystal polymers, poly(methyl methacrylate) co-polymer, tetrafluoroethylene-based polymers, sulfonated tetrafluoroethylene co-polymers, fluorinated ionomers, polymer corresponding to, or included in, polymer electrolyte membranes, ethanesulfonyl fluoride-based polymers, polymers based on 2-[1-[difluoro-[(trifluoroethenyl)oxy]methyl]-1,2,2,2-tetrafluoroethoxy]-1,1,2,2,-tetrafluoro-, with tetrafluoro ethylene, tetrafluoroethylene-perfluoro-3,6-dioxa-4-methyl-7-octenesulfonic acid co-polymer, polyisoprene, polymers based on vinylidene fluoride, polymers based on trifluoroethylene, poly(vinylidene fluoride-trifluoroethylene), poly(phenylene vinylene), polymers based on copper phthalocyanine, cellophane, cuprammonium-based polymers, rayon, and biopolymers (e.g., cellulose acetate (or CA), cellulose acetate butyrate (or CAB), cellulose acetate propionate (or CAP), cellulose propionate (or CP), polymers based on urea, wood, collagen, keratin, elastin, nitrocellulose, celluloid, bamboo, bio-derived polyethylene, carbodiimide, cartilage, cellulose nitrate, cellulose, chitin, chitosan, connective tissue, copper phthalocyanine, cotton cellulose, glycosaminoglycans, linen, hyaluronic acid, paper, parchment, starch, starch-based plastics, vinylidene fluoride, and viscose), or any monomer, co-polymer, blend, or other combination thereof. Additional examples of suitable substrates include ceramics, such as dielectric or non-conductive ceramics (e.g., $SiO_2$-based glass; $SiO_x$-based glass; $TiO_x$-based glass; other titanium, cerium, and magnesium analogues of $SiO_x$-based glass; spin-on glass; glass formed from sol-gel processing, silane precursor, siloxane precursor, silicate precursor, tetraethyl orthosilicate, silane, siloxane, phosphosilicates, spin-on glass, silicates, sodium silicate, potassium silicate, a glass precursor, a ceramic precursor, silsesquioxane, metallasilsesquioxanes, polyhedral oligomeric silsesquioxanes, halosilane, sol-gel, silicon-oxygen hydrides, silicones, stannoxanes, silathianes, silazanes, polysilazanes, metallocene, titanocene dichloride, vanadocene dichloride; and other types of glasses), conductive ceramics (e.g., conductive oxides and chalcogenides that are optionally doped and transparent, such as metal oxides and chalcogenides that are optionally doped and transparent), and any combination thereof. Additional examples of suitable substrates include electrically conductive materials and semiconductors, such as electrically conductive polymers like poly(aniline), poly (3,4-ethylenedioxythiophene) (PEDOT), polystyrene sulfonate (PSS), PEDOT-PSS, and so forth. The substrate may be, for example, n-doped, p-doped, or un-doped. Further examples of substrate materials include polymer-ceramic composite, polymer-wood composite, polymer-carbon composite (e.g., formed of ketjen black, activated carbon, carbon black, graphene, and other forms of carbon), polymer-metal composite, polymer-oxide, or any combination thereof. The substrate material may also incorporate a reducing agent, a corrosion inhibitor, a moisture barrier material, or other organic or inorganic chemical agent (e.g., PMMA with ascorbic acid, COP with a moisture barrier material, or PMMA with a disulfide-type corrosion inhibitor). The substrate may be a polymeric film, such as a polyester film, a PET film, a thermoplastic polyurethane (TPU), or a textile. Other suitable non-metallic substrates may include wood, veneer, wood composite, particle board, medium density fiberboard, cement, stone, leather (e.g., natural and/or synthetic), glass, ceramic, asphalt, and the like.

The positive temperature coefficient component may include a conductive ink disposed over at least a portion of the substrate and/or the positive temperature coefficient layer. The conductive ink may be made of a conductive material. The conductive material may include at least one of silver, copper, or other conductive material, or some combination thereof.

The positive temperature coefficient component may include a positive temperature coefficient layer over at least a portion of the substrate and/or the conductive ink, the positive temperature coefficient layer formed from a conductive composition.

In some examples, the conductive ink may be applied over the substrate, the positive temperature coefficient layer may be applied over the conductive ink, and the topcoat layer may be applied over the positive temperature coefficient layer. In some examples, the positive temperature coefficient layer may be applied over the substrate, the conductive ink may be applied over the positive temperature coefficient layer, and the topcoat layer may be applied over the conductive ink. The conductive ink and the positive temperature coefficient layer may both be applied over the substrate (directly or indirectly), with either or both of the conductive ink and the positive temperature coefficient layer being in direct contact with the substrate.

The conductive composition may include an electrically and/or thermally conductive composition, comprising: (a) a non-conductive material; and (b) conductive particles dispersed in the non-conductive material.

The conductive composition may include an electrically and/or thermally conductive composition, comprising: (a) a polyester polymer (i.e., the non-conductive material) having a backbone comprising at least 12 consecutive carbon atoms between ester linkages; and (b) conductive particles dispersed in the polyester polymer.

The polyester polymer may include a backbone that comprises at least 12 consecutive carbon atoms between ester linkages (the count of consecutive carbons including the carbon forming a part of the ester linkage), such as at least 14, at least 16, at least 18, or at least 20 consecutive carbon atoms between ester linkages. The backbone with the consecutive carbon chain may include a repeating carbon-containing unit, such as consecutive methylene groups. The backbone with the consecutive carbon chain may contain a mix of carbon-containing units, such as a mix of methylene and carbonyl groups.

The polyester polymer may include a plurality of polyester polymers including a first polyester polymer having a backbone comprising at least 12 consecutive carbon atoms between ester linkages and a second polyester polymer having a backbone comprising at least 12 consecutive carbon atoms between ester linkages, wherein the first polyester polymer is different from the second polyester polymer. The first polyester polymer and the second polyester polymer may be separate polymers, or the first polyester polymer and the second polyester polymer may form a co-polymer.

The polyester polymer may include the following chemical structure:

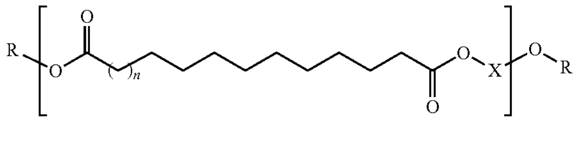

where n≥1, X is a species derived from any polyol used to prepare the polyester polymer, and R is any component, including H.

The polyester polymer may include the following chemical structure:

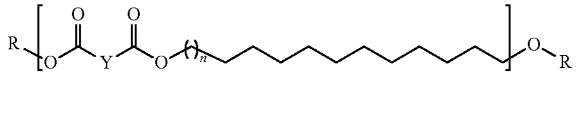

where Y is a species derived from any polyacid (including polyacid halide), polyester, or the like used to prepare the polyester polymer, and n and R are as defined above.

The polyester polymer may have a linear structure. As used herein, the term "linear structure" refers to a straight chain polymer free of branches forming off of the straight chain. The polyester polymer may be substantially free of branching, such that the degree of branching of the polyester polymer is less than a level that would decrease the endotherm (glass transition endotherm or melting endotherm) by 50% compared to the completely linear polyester polymer. The glass transition endotherm and the melting endotherm are measured according to ASTM D3418. To determine the glass transition endotherm or the melting endotherm, a specimen of each sample is sealed in an aluminum hermetic pan and scanned twice in a TAI Discovery DSC from −30 to 250° C. at 10° C./min. The DSC is calibrated with indium, tin and zinc standards and the nominal nitrogen purge rate is 50 mL/min. The half-height glass transition temperatures (Tg) are determined by two points and the peak areas are determined using a linear baseline.

The polyester polymer may include a non-aromatic polyester polymer. As used herein, the term "non-aromatic polyester polymer" refers to a polyester polymer free of aromatic groups. As used herein, the term "aromatic group" refers to a cyclic, planar molecule with a ring of resonance bonds that exhibits more stability than other geometric or connective arrangements with the same set of atoms.

The polyester polymer may include a saturated polyester polymer. As used herein, the term "saturated polyester polymer" refers to a polyester polymer in which all atoms are linked by single bonds, excluding the ester linkages. The polyester polymer may be an unsaturated polyester polymer having one or two degrees of unsaturation, excluding ester linkages.

The polyester polymer may include a semi-crystalline polyester polymer. As used herein, the term "semi-crystalline polyester polymer" refers to a polyester polymer containing both crystalline regions and amorphous regions.

The polyester polymer may include a bio-based polyester polymer. As used herein, the term "bio-based polyester polymer" refers to a polyester polymer prepared at least partially from bio-based monomers. The polyester polymer may be prepared using a diacid monomer, which diacid monomer may be derived from plant or vegetable oil. The polyester polymer may be prepared using a polyol derived from plant or vegetable oil. The polyester polymer may be prepared using glycerin as the polyol.

The polyester polymer may be prepared from a reaction of a polyacid component and/or a polyester component with a polyol component. The polyacid component may include a diacid monomer. The polyacid component may include a polyacid halide. The polyester component may include a diester monomer.

As used herein, the term "polyacid" refers to a compound having two or more acid or acid equivalent groups (or combination thereof) and includes the ester and or anhydride of the acid. By "acid equivalent groups", it is meant that the non-double bonded oxygen in the acid group has been substituted with another component, such as a halide component. Thus, the polyacid may include a polyacid halide or other polyacid equivalent. "Diacid" refers to a compound having two acid groups and includes the ester and or anhydride of the diacid. As used herein, the term "polyester" refers to a compound having two or more ester groups. "Diester" refers to a compound having two ester groups. As used herein, the term "polyol" refers to a compound having two or more hydroxyl groups.

The polyester polymer may be a reaction product of a polyol with a polyacid (e.g., a diacid) including an at least 12 consecutive carbon atom chain, such as an at least 14, at least 16, at least 18, or at least 20 consecutive carbon atom chain. The polyester polymer may be a reaction product of a polyol with a polyester (e.g., a diester) including an at least 12 consecutive carbon atom chain, such as an at least 14, at least 16, at least 18, or at least 20 consecutive carbon atom chain. The polyester polymer may be a reaction product of a polyol including an at least 12 consecutive carbon atom chain, such as at least 14, at least 16, at least 18, or at least 20 consecutive carbon atom chain and a polyester or polyacid. Thus, the polyester polymer may include a polyester polyol polymer and/or a polyester polyacid polymer.

Suitable polyacids for preparation of the polyester polymer include, but are not limited to, saturated polyacids such as adipic acid, azelaic acid, sebacic acid, succinic acid, glutaric acid, octadecanedioic acid, hexadecanedioic acid, tetradecanedioic acid, decanoic diacid, dodecanoic diacid, cyclohexanedioic acid, hydrogenated C36 dimer fatty acids, and esters and anhydrides thereof. Suitable polyacids include polyacid halides. The polyacid may comprise from 20 to 80 weight percent of the reaction mixture, such as from 30 to 70 weight percent or from 40 to 60 weight percent. Combinations of any of these polyacids may be used.

Suitable polyesters for preparation of the polyester polymer include, but are not limited to esters of the above-listed suitable polyacids. The polyester may comprise from 20 to 80 weight percent of the reaction mixture, such as from 30 to 70 weight percent or from 40 to 60 weight percent. Combinations of any of these polyesters may be used.

Suitable polyols for preparation of the polyester polymer include, but are not limited to any polyols known for making polyesters. Examples include, but are not limited to, alkylene glycols, such as ethylene glycol, propylene glycol, diethylene glycol, dipropylene glycol, 1,2-propylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; 2,2,4-trimethyl-1,3-pentanediol, cyclohexanedimethanol; hexanediols including 1,6-hexanediol; 2-ethyl-1,3-hexanediol, caprolactonediol (for example, the reaction product of epsilon-caprolactone and ethylene glycol); hydroxyalkylated bisphenols; polyether glycols, for example, poly(oxytetramethylene) glycol; trimethylol propane, di-trimethylol propane, pentaerythritol, di-pentaerythritol, trimethylol ethane, trimethylol butane, dimethylol cyclohexane, glycerol, tris(2-hydroxyethyl) isocyanurate and the like.

Combinations of any of these polyols may be used to form at least one polyester polymer used in the conductive composition. The conductive composition may include a plurality of different types of polyester polymers, each polyester polymer prepared using a different polyol and/or combination of polyols. The conductive composition may include a single type of polyester polymer, with the polyester polymer prepared including a plurality of different types of polyols. The combination of polyols (used to prepare the single or multiple polyester polymers for inclusion in the conductive composition) may include, as non-limiting examples, at least one of 1,2 butane diol, 1,3 butane diol, 1,4 butane diol, and 1,6 hexane diol.

The polyester polymer itself (of the conductive composition) may be a non-conductive polymer.

The conductive composition may include at least 5 weight percent of the polyester polymer, based on the total weight of the conductive composition, such as at least 10 weight percent, at least 20 weight percent, or at least 30 weight percent. The conductive composition may include up to 40 weight percent of the polyester polymer, based on total weight of the conductive composition, such as up to 30 weight percent, up to 20 weight percent, or up to 10 weight percent. The conductive composition may include from 5 to 40 weight percent of the polyester polymer, based on the total weight of the conductive composition, such as from 10 to 30 weight percent or from 10 to 20 weight percent.

The conductive composition may include at least 25 weight percent of the polyester polymer, based on the total solids weight of the conductive composition, such as at least 30 weight percent, at least 40 weight percent, or at least 50 weight percent. The conductive composition may include up to 60 weight percent of the polyester polymer, based on total solids weight of the conductive composition, such as up to 50 weight percent, up to 45 weight percent, or up to 40 weight percent. The conductive composition may include from 25 to 60 weight percent of the polyester polymer, based on total solids weight of the conductive composition, such as from 30 to 60 weight percent or from 40 to 50 weight percent.

The polyester polymer may be included in the conductive composition with other polymers. The polyester polymer may be incorporated as a segment of a polymer included in the conductive composition. For example, the polyester polymer may be reacted with an isocyanate to form a polyurethane polymer comprising the polyester polymer as a segment thereof. The polyester segment of the polyurethane polymer would still result in PTC properties to the polymer, at critical temperatures.

The non-conductive material of the conductive composition may comprise a wax. The wax may comprise a polypropylene wax, a polytetrafluorethylene (PTFE) wax, a polyamide wax, and/or a polyethylene wax (such as those available under the tradename POLYWAX™ from Baker Hughes (Houston, TX)). The wax may comprise beeswax, lanolin wax, shellac wax, bayberry wax, candelilla wax, carnauba wax, castor wax, jojoba wax, ouricury wax, soy wax, ceresin wax, montan wax, ozocerite wax, paraffin wax, and/or microcrystalline wax. Combinations of these various waxes may also be used. The wax may have a melting endotherm (measured as previously described) corresponding to the trip temperature, as hereinafter described, such as a melting endotherm in a range from 20° C. to 160° C., such as from 20° C. to 120° C., 30° C. to 100° C., 40° C. to 95° C., 50° C. to 90° C., 60° C. to 90° C., 30° C. to 70° C., 35° C. to 65° C., or 40° C. to 60° C.

The non-conductive material of the conductive composition comprising the wax may further comprise a co-polymer, such as a block co-polymer. The block co-polymer may include a styrenic thermoplastic block co-polymer, such as a styrene-ethylene/butylene-styrene (SEBS) or styrene-ethylene/propylene-styrene (SEPS) block co-polymer. A non-limiting example of such a block co-polymer includes KRATON™ G from Kraton Corporation (Houston, TX).

The non-conductive material of the conductive composition may include a polycaprolactone, a polyurethane, and/or some combination thereof. The non-conductive material of the conductive composition may include a polyester, such as a saturated polyester. The non-conductive material may include a co-polymer. The non-conductive material may include a propylene maleic anhydride. The non-conductive material may include a non-conductive material having a melting endotherm (measured as previously described) corresponding to the trip temperature, as hereinafter described, such as a melting endotherm in a range from 20° C. to 160° C., such as from 20° C. to 120° C., 30° C. to 100° C., 40° C. to 95° C., 50° C. to 90° C., 60° C. to 90° C., 30° C. to 70° C., 35° C. to 65° C., or 40° C. to 60° C.

The non-conductive material of the conductive composition may comprise any combination of the above-described non-conductive materials.

The conductive particles may be dispersed in any of the above-described non-conductive materials to form the conductive composition. By "dispersed in", it is meant that the conductive particles are provided in and around the non-conductive material, but are not a component of the non-conductive material. The conductive particles may be any suitable conductive particle sufficient for conducting electricity through the conductive composition at certain operating conditions.

Suitable conductive particles include, but are not limited to conductive carbonaceous material, such as carbon black, carbon nanotubes, graphite, graphite/carbon, graphitized carbon black, or other graphenic particles that would not shear exfoliate into sheets during processing. Other suitable conductive particles may include nickel powders, silver (e.g., silver nanowires), copper, silver-coated copper, aluminum, metallized carbon black, metal particles covered with different metals, ceramic conductive particles such as titanium nitride, titanium carbide, molybdenum silicide, tungsten carbide, potassium titanate whiskers, gold powder, tungsten, molybdenum, cobalt, zinc, or some combination thereof.

The conductive particles may have a structure, as measured by Oil Absorption Number (OAN), within the range of 345 cc/100 g to 60 cc/100 g according to ASTM D2414. The conductive particles may have a porosity of from 800 $m^2/g$ to 11 $m^2/g$, as measured by total and external surface area according to ASTM D6556 and/or ASTM D3037.

The conductive composition may include at least 30 weight percent of the conductive particles, based on the weight of only the above-described non-conductive material and the conductive particles, such as at least 40 weight percent, at least 50 weight percent, or at least 60 weight percent. The conductive composition may include up to 70 weight percent of the conductive particles, based on the weight of only the above-described non-conductive material and the conductive particles, such as up to 60 weight percent, up to 50 weight percent, or up to 40 weight percent. The conductive composition may include from 30 to 70 weight percent of the conductive particles, based on the weight of only the above-described non-conductive material and the conductive particles, such as from 40 to 60 weight percent or from 40 to 50 weight percent.

The non-conductive material and the conductive particles may be dispersed in a solvent to prepare the conductive composition. Suitable solvents that can be used to dissolve or disperse the non-conductive material and/or the conductive particles include an organic solvent or mixtures thereof (a solvent blend). The solvent blend may comprises a blend of diacetone alcohol and methylnaphthalene. The solvent may disperse the non-conductive material and/or the conductive particles at room temperature (20° C.-27° C.) such that they do not fall out of solution after being held for 30 minutes at 40° C. and/or after being held for 3 hours at 60° C.

The solvent or solvent blend may exhibit a Hansen solubility parameter (δ) of from 17.0 to 21.5 $(J/cm)^{1/2}$, such as from 19 to 21 $(J/cm)^{1/2}$ or from 19.5-20.5 $(J/cm)^{1/2}$ or from 19.8 to 20.5 $(J/cm)^{1/2}$. For each chemical molecule (e.g., chemical molecule of the solvent), three Hansen parameters are given, each measured in $Mpa^{0.5}$: $\delta_d$, the energy from dispersion bonds between molecules; $\delta_p$, the energy from polar bonds between molecules; and $\delta_h$, the energy from hydrogen bonds between molecules. These three Hansen parameters are used to determine the Hansen solubility parameter based on the following equation:

$$\delta^2=\delta_p^2+\delta_h^2$$

The Hansen parameters for dispersive, polar, and hydrogen-bonding components for calculating the Hansen solubility parameter are available in the commercially available HSPiP software.

The conductive composition may have a pigment to binder (P:B) ratio of from 0.5 to 2, such as 0.6 to 1.5 or from 0.6 to 1.1.

The positive temperature coefficient layer formed from the conductive composition may exhibit a trip temperature in a range from 20° C. to 160° C., such as from 20° C. to 120° C., 30° C. to 100° C., 40° C. to 95° C., 50° C. to 90° C., 60° C. to 90° C., 30° C. to 70° C., 35° C. to 65° C., or 40° C. to 60° C. Trip temperature refers to the temperature at which a maximum slope is exhibited in a graph of normalized resistance over temperature for the positive temperature coefficient layer (see "Steepest Rise" and "Temperature for Steepest Rise" below). The positive temperature coefficient layer may exhibit a narrow endotherm, which refers to the positive temperature coefficient layer having an R65° C./R25° C. and/or an R85° C./R25° C. value of at least 5, such as at least 8, at least 10, at least 12, at least 15, or at least 20. The positive temperature coefficient layer may have an R45° C./R25° C. and/or a R65° C./R25° C. and/or a R85° C./R25° C. value of from 5 to 50, such as from 5 to 30, from 5 to 20, from 5 to 15, from 5 to 10, from 10 to 50, from 10 to 30, from 10 to 20, from 10 to 15, from 15 to 50, from 15 to 30, from 15 to 20, from 20 to 50, or from 20 to 30.

Figure 2:
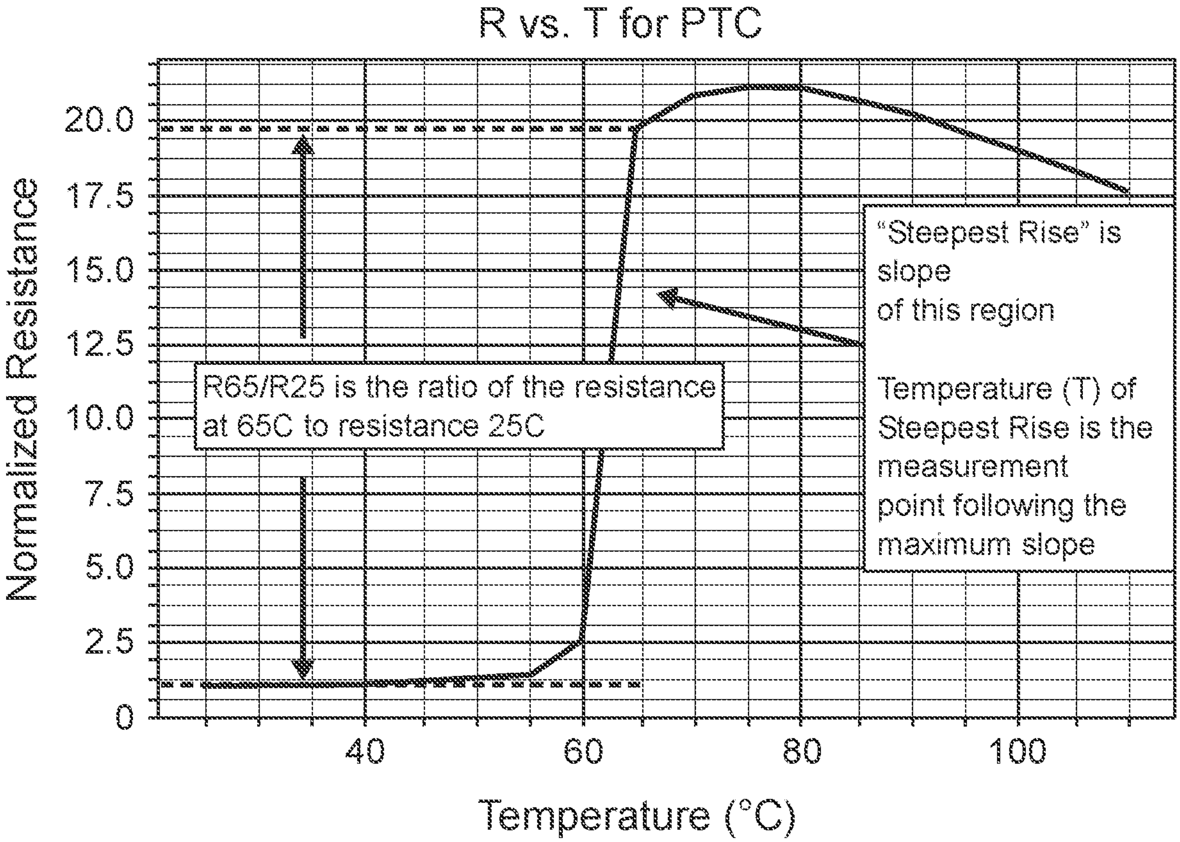
FIG. 2 shows a graph of Normalized Resistance v. Temperature for a conductive composition having a trip temperature.

Steepest Rise: the slope in 1/° C. of the steepest point in a normalized resistance vs. temperature plot. Normalized resistance is defined as the measured resistance at a given temperature in Ω divided by the initial resistance at 25° C. in Ω. See FIG. 2.

Temperature for Steepest Rise (also referred to as "Trip Temperature"): the temperature at which the next data point is recorded for following the segment with the steepest slope in 1/° C. in a normalized resistance vs. temperature plot. See FIG. 2.

R45° C./R25° C.: the ratio of the resistance in Ω at 45° C. to the resistance in Ω at 25° C., using the equation ((R(temp° C.)/R25° C.)−1) to normalize the ratio at 25° C. to 0.

R65° C./R25° C.: the ratio of the resistance in Ω at 65° C. to the resistance in Ω at 25° C., using the equation ((R(temp° C.)/R25° C.)−1) to normalize the ratio at 25° C. to 0. See FIG. 2.

R85° C./R25° C.: the ratio of the resistance in Ω at 85° C. to the resistance in Ω at 25° C., using the equation ((R(temp° C.)/R25° C.)−1) to normalize the ratio at 25° C. to 0.

The conductive composition may be thermally and/or electrically conductive when applied to form the positive temperature coefficient layer. As used herein, "thermally conductive" means a material having a thermal conductivity of at least 0.5 W/m*K at conditions below the trip temperature. Thermal conductivity is measured according to ASTM D5470. As used herein, "electrically conductive" means a material having an electrical volume resistivity of less than 20 kΩ/sq/mil at conditions below the trip temperature when substantially all (at least 99%) solvent from the conductive composition has been removed. Electrical volume resistivity is calculated by screen printing the conductive composition on a 600 square serpentine. A point to point resistance of the serpentine is measured and a film height is recorded utilizing a SURFCOM™ 130A Profilometer.

The positive temperature coefficient component including the substrate, the conductive ink disposed over at least a portion of the substrate, and the positive temperature coefficient layer disposed over at least a portion of substrate may form a completable circuit, closed when below the trip temperature of the positive temperature coefficient layer, and open when above the trip temperature of the positive temperature coefficient layer. A topcoat layer may be formed over at least a portion of this completable circuit.

The positive temperature coefficient component may include a topcoat layer formed from a coating composition (a topcoat composition) comprising a dielectric material disposed over at least a portion of the positive temperature coefficient layer and/or the conductive ink. The topcoat layer may be the outermost layer of the positive temperature coefficient component. The topcoat composition may be applied over at least a portion of the substrate, the conductive ink, and/or the positive temperature coefficient layer to form the topcoat layer. The topcoat composition may be a liquid coating composition. The topcoat layer formed from the topcoat composition may be a coating layer. As used herein, "coating layer" refers to a supported film derived from a flowable composition, which may or may not have a uniform thickness. The supported film may be a continuous film. As such, the topcoat layer formed from the topcoat composition as a coating layer may be different from a laminate layer and/or an adhesive layer (e.g., an adhesive sticker). The coating layer may not be a laminate layer and/or an adhesive layer.

The topcoat composition may include a dielectric material. As used herein, "dielectric material" refers to an electrically insulating material that can sustain an electric field by electrically polarizing upon introduction thereto. The dielectric material may exhibit a dielectric breakdown of at least 1.4 kV, as determined according to ASTM D149.

The dielectric material may comprise a (meth)acrylic material. The dielectric material may comprise an acrylic material. The (meth)acrylic material may include a (meth)acrylic oligomer and/or a (meth)acrylic polymer. The (meth)acrylic material may include a polyester (meth)acrylate, a urethane (meth)acrylate, an epoxy (meth)acrylate, a polyether (meth)acrylate, and/or some combination thereof. The (meth)acrylic material may be curable using ultraviolet (UV) radiation (from 10 nm to 400 nm, such as 180 to 400 nm), such that the material is photopolymerized by the UV radiation at the energy densities described hereinafter (UV curable). Suitable sources of ultraviolet radiation are widely available and, include, for example, mercury arcs, carbon arcs, low pressure mercury lamps, medium pressure lamps, high pressure mercury lamps, swirl-flow plasma arcs, and ultraviolet light emitting diodes.

When UV light is used to cure the dielectric material the topcoat composition may comprise a photopolymerization initiator (and/or photopolymerization sensitizer). Non-limiting examples of photoinitiators/photosensitizers suitable for use with the present invention include isobutyl benzoin ether, mixtures of butyl isomers of butyl benzoin ether, α,α-diethoxyacetophenone, α,α-dimethoxy-α-phenylacetophenone, benzophenone, anthraquinone, thioxanthone, and phosphine oxides. UV stabilizers can also be added including, but not limited to, benzotriazoles, hydrophenyl triazines, and hindered amine light stabilizers.

The dielectric material may comprise a polyurea polymer and/or a polyurethane polymer. The polyurea polymer and/or a polyurethane polymer may be UV curable as described above in connection with the (meth)acrylic material. The polyurea polymer and/or a polyurethane polymer may be curable at ambient temperature without applying radiation, as described hereinafter.

The topcoat composition may be applied over at least a portion of the substrate and/or the conductive ink and/or the positive temperature coefficient layer and cured to form the topcoat layer.

The topcoat composition may be cured to form the topcoat layer by applying UV radiation thereto. The topcoat composition may be UV curable to form the topcoat layer at an energy density sufficiently low so as to avoid damaging the underlying completable circuit, including the positive temperature coefficient layer, the conductive ink, and/or the substrate. The topcoat composition may be UV curable to form the topcoat layer at an energy density of from 50 $mJ/cm^2$ to 2000 $mJ/cm^2$, such as 200 $mJ/cm^2$ to 800 $mJ/cm^2$, 300 $mJ/cm^2$ to 700 $mJ/cm^2$, or 300 $mJ/cm^2$ to 500 $mJ/cm^2$. The topcoat composition may be UV curable to form the topcoat layer at an energy density up to 2000 $mJ/cm^2$, such as up to 800 $mJ/cm^2$ or up to 700 $mJ/cm^2$. The topcoat composition may be UV curable to form the topcoat layer at an energy density of at least 50 $mJ/cm^2$, such as at least 200 $mJ/cm^2$ or at least 300 $mJ/cm^2$. Energy density is determined using a POWER PUCK® II Radiometer measuring the UVA band, available from EIT (Sterling, VA). The topcoat composition may be cured with UV radiation at temperatures from ambient temperature (20° C.-25° C.) to 160° C., such as from ambient to 60° C., such as from ambient temperature to 50° C. The temperature may not exceed the melting endotherm of the non-conductive material of the conductive composition.

The topcoat composition may be cured, without application of UV radiation, upon exposure to temperatures from ambient temperature (20° C.-25° C.) to 160° C., such as from ambient to 60° C., such as from ambient temperature to 50° C. The temperature may not exceed the melting endotherm of the non-conductive material of the conductive composition. The topcoat composition may be fully cured at these temperatures in up to 60 minutes, such as up to 40 minutes, up to 30 minutes, or up to 20 minutes. At these temperatures, the topcoat coating composition may self-crosslink. At these temperatures, the topcoat coating composition may undergo a crosslinking reaction with a crosslinking agent, such as a carbodiimide.

The 24-hour loop resistance of the positive temperature coefficient component including the topcoat layer may be less than a loop resistance that would cause the underlying circuit to fail (not turn on). The 24-hour loop resistance of the positive temperature coefficient component including the topcoat layer may be less than 100% higher, such as less than 90% higher, less than 80% higher, less than 70% higher, less than 60% higher, less than 50% higher, less than 40% higher, less than 30% higher, less than 25% higher, less than 20% higher, less than 15% higher, less than 10% higher, or less than 5% higher than the loop resistance of the same positive temperature coefficient component except not including the topcoat layer. 24-hour loop resistance of a positive temperature coefficient component herein was determined by determining the loop resistance of the PTC component without the topcoat and the loop resistance of the PTC component coated with the topcoat 24 hours after cure and calculating the percent difference therebetween. Loop resistance was determined using a FLUKE® 189 multimeter.

Referring to FIG. 1, a positive temperature coefficient component 10 including the conductive composition 14 is shown. The component 10 may include two electrodes 12*a*, 12*b* in contact with (in electrical communication with) the positive temperature coefficient layer formed from the conductive composition 14. The conductive composition 14 may include the non-conductive material 16 and the conductive particles 18 dispersed in the non-conductive material 16. The component 10 may further include a power source 20 configured to flow a current through the positive temperature coefficient layer formed from the conductive composition 14 via the electrodes 12*a*, 12*b* at certain operating conditions of the component 10. Thus, the power source 20 may be in electrical communication with the electrodes 12*a*, 12*b* and the positive temperature coefficient layer formed from the conductive composition 14.

With continued reference to FIG. 1, the component 10 is shown at operating conditions before a trip temperature 22 is reached, at which the conductive composition conducts current from the power source 20 (diagram left of the trip temperature 22) and at operating conditions after heating the component 10 so that the trip temperature 22 is reached, at which the conductive composition stops conducting current from the power source 20 (diagram right of the trip temperature 22). Before the trip temperature 22, the conductive particles 18 dispersed in the non-conductive material 16 in the positive temperature coefficient layer formed from the conductive composition 14 may be in sufficient contact (form a closed circuit), such that the positive temperature coefficient layer formed from the conductive composition 14 conducts the current provided by the power source 20 through the contacting conductive particles 18. After heating the component 10 above the trip temperature 22, the non-conductive material 16 of the positive temperature coefficient layer formed from the conductive composition 14 has expanded a sufficient amount (compared to below the trip temperature) that the conductive particles 18 dispersed in the non-conductive material 16 of the positive temperature coefficient layer formed from the conductive composition 14 are not in sufficient contact (form an open circuit), such that the positive temperature coefficient layer formed from the conductive composition 14 no longer conducts a current from the power source 20 therethrough so that no further heating occurs until the temperature falls below the trip temperature.

Therefore, based on the above-described arrangement, the component may self-regulate temperature without a separate controller based on the trip temperature 22 of the positive temperature coefficient layer formed from the conductive composition 14 acting as a self-controller (e.g., based on the material properties of the positive temperature coefficient layer formed from the conductive composition 14).

The component including the positive temperature coefficient layer formed from the conductive composition may include a heating element or an overcurrent protection element. A heating element is an element that converts electrical energy into heat. An overcurrent protection element is a component that protects the component by opening a circuit when the current reaches a value that will cause an excessive or dangerous temperature rise in conductors. The heating element or overcurrent protection element may be a vehicle component, an architectural component, clothing (including shoes and other wearables), furniture (e.g., a mattress), a sealant, a battery enclosure, a medical component, a heating pad (and other therapeutic wearables), a fabric, an industrial mixing tank, and/or an electrical component. The vehicle component refers to any component included in a vehicle, such as an automobile (e.g., an electric car and/or a car including an internal combustion engine), and may include, for instance, heated car components, such as steering wheels, arm rests, seats, floors headliners; battery packs optimizing battery temperature of batteries included the vehicle; external automotive heating components; and the like. The architectural component refers to any component included in structures, such as a building, for instance, heated flooring, driveways, walls, ceilings, other components used in residential heating applications, and the like. The electrical component refers to any component associated with a device which conducts and/or generates electricity, such as battery enclosures/battery packs, a bus bar, and the like. The component is not limited to these examples, and it will be appreciated that the component including the positive temperature coefficient layer formed from the conductive composition may be any component in which temperature and/or current is to be controlled to prevent overheating of the component without requiring a separate controller component. The conductive composition may be a printable dielectric over layer that provides protection from potential damage to the substrate over which it is applied.

Figure 3:
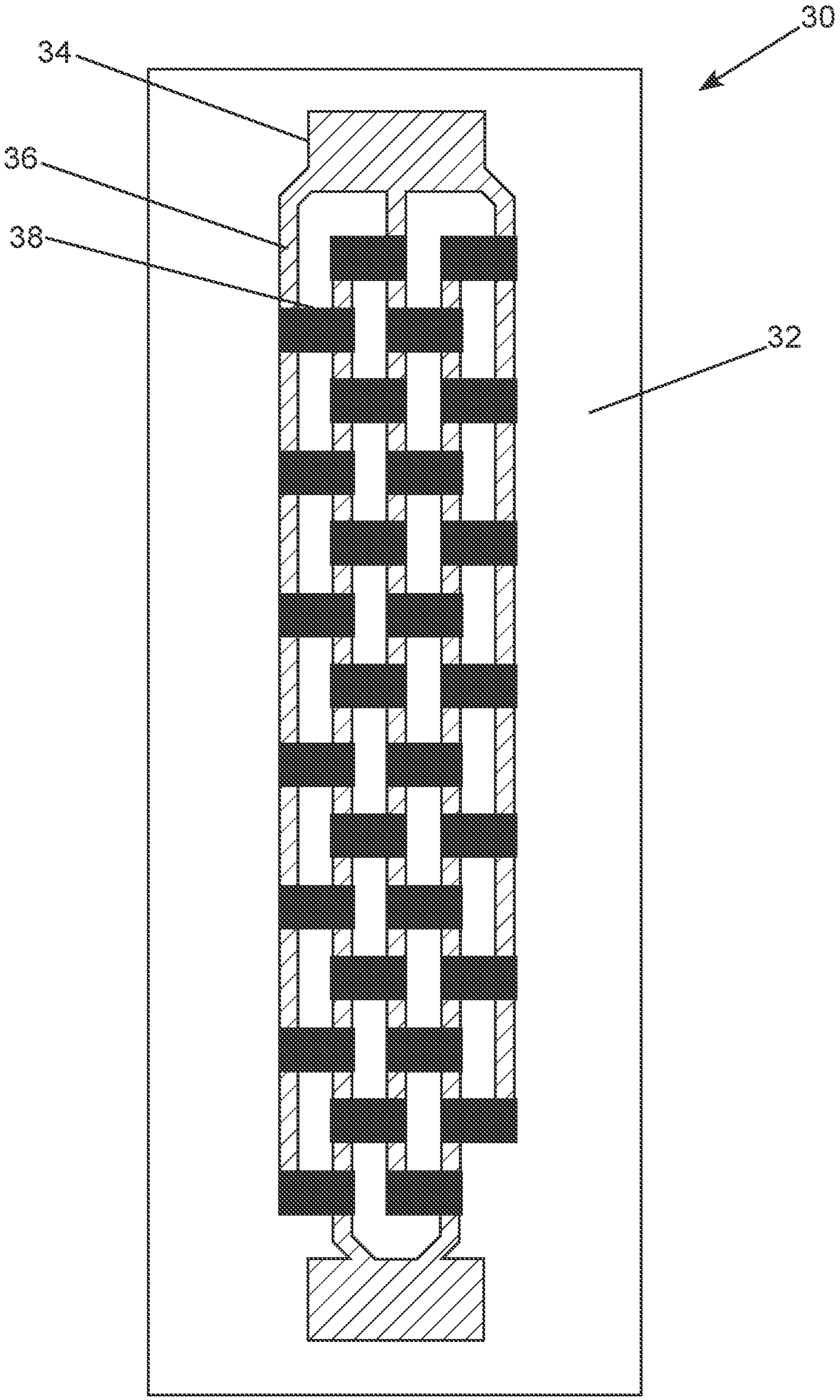
FIG. 3 shows a top view of a positive temperature coefficient component without a topcoat layer.

Referring to FIG. 3, a positive temperature coefficient component 30 including a positive temperature coefficient layer formed from the conductive composition but without a topcoat layer is shown. The component 30 may include a substrate 32, such as any of the previously-described substrates. The component 30 may include a plurality of electrodes 34 functioning as terminals of the component 30 and configured to place a positive temperature coefficient layer 38 in electrical communication with a power source. The electrodes 34 may be printed onto the substrate 32. The component 30 may include a conductive ink 36 electrically connected to at least one of the electrodes 34. The conductive ink 36 may be printed onto the substrate 32 in a pattern. The conductive ink 36 may be printed onto the substrate 32 in a number of segments, with at least one of the segments electrically connected to one of the electrodes 34 and another of the segments connected to the other of the electrodes 34 and with the segments of the conductive ink 36 not in direct contact with one another. For example, as shown in FIG. 3, the segments of conductive ink 36 may include parallel lines of conductive 36 ink electrically connected to (in electrical communication with) alternating electrodes, with adjacent parallel lines not directly connected to one another by the conductive ink 36. The electrode 34 and the conductive ink 36 may be made of a same or different material. The electrode 34 and conductive ink 36 may be made of a conductive material. The electrode 34 and/or the conductive ink 36 may be made of the same or different conductive material and may be printed on the substrate 32 simultaneously. The conductive material may include at least one of silver, copper, or other conductive material, or some combination thereof.

With continued reference to FIG. 3, the component 30 may include the conductive composition forming the positive temperature coefficient layer 38. The positive temperature coefficient layer 38 may include a plurality of separate sections, with each section electrically connecting the previously-described separate segments of the conductive ink 36. As such, when below the trip temperature of the positive temperature coefficient layer 38 formed from the conductive composition, the positive temperature coefficient layer 38 completes the circuit, such that current can flow from one segment of the conductive ink 36 to the separate segment of the conductive ink 36 spanned by the positive temperature coefficient layer 38. As such, when above the trip temperature of the positive temperature coefficient layer 38 formed from the conductive composition, the positive temperature coefficient layer 38 causes the circuit to be open (the conductive ink 36 segments are not in direct contact with each other), such that current cannot flow from one segment of the conductive ink 36 to the separate segment of the conductive ink 36 spanned by the positive temperature coefficient layer 38.

Figure 4:
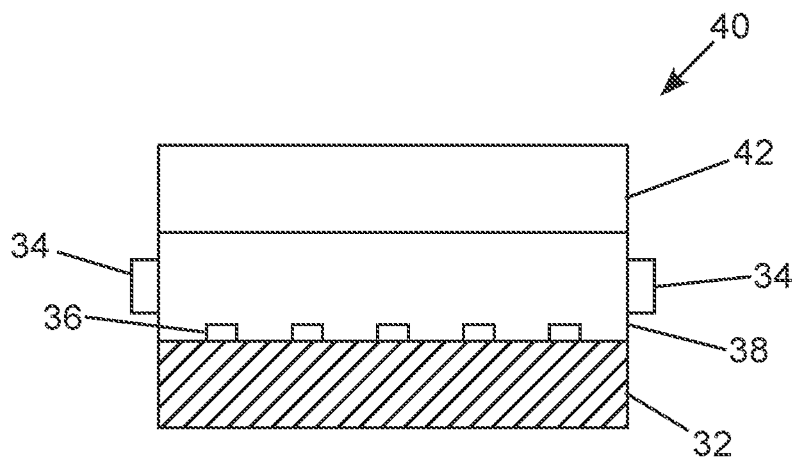
FIG. 4 shows a cross-sectional side view of a positive temperature coefficient component including a topcoat layer.

Referring to FIG. 4, a positive temperature coefficient component 40 including a positive temperature coefficient layer formed from the conductive composition and including a topcoat layer formed form the topcoat composition thereover is shown. The component 40 may include the substrate 32, such as any of the previously-described substrates. The component 40 may include a plurality of electrodes 34 functioning as terminals of the component 40 and configured to place the positive temperature coefficient layer 38 in electrical communication with a power source. The electrodes 34 may be printed onto the substrate 32. The component 40 may include a conductive ink 36 electrically connected to at least one of the electrodes 34. The conductive ink 36 may be printed onto the substrate 32 in a pattern. The conductive ink 36 may be printed onto the substrate 32 in a number of segments, with at least one of the segments electrically connected to one of the electrodes 34 and another of the segments connected to the other of the electrodes 34 and with the segments of the conductive ink 36 not in direct contact with one another (see FIG. 3). The electrode 34 and the conductive ink 36 may be made of a same or different material. The electrode 34 and conductive ink 36 may be made of a conductive material. The electrode 34 and/or the conductive ink 36 may be made of the same or different conductive material and may be printed on the substrate 32 simultaneously. The conductive material may include at least one of silver, copper, or other conductive material, or some combination thereof.

With continued reference to FIG. 4, the component 40 may include the conductive composition forming a positive temperature coefficient layer 38. The positive temperature coefficient layer 38 may include a plurality of separate sections, with each section electrically connecting the previously-described separate segments of the conductive ink 36. As such, when below the trip temperature of the positive temperature coefficient layer 38 formed from the conductive composition, the positive temperature coefficient layer 38 completes the circuit, such that current can flow from one segment of the conductive ink 36 to the separate segment of the conductive ink 36 spanned by the positive temperature coefficient layer 38. As such, when above the trip temperature of the positive temperature coefficient layer 38 formed from the conductive composition, the positive temperature coefficient layer 38 causes the circuit to be open (the conductive ink 36 segments are not in direct contact), such that current cannot flow from one segment of the conductive ink 36 to the separate segment of the conductive ink 36 spanned by the positive temperature coefficient layer 38.

With continued reference to FIG. 4, the component 40 may include the topcoat composition over at least a portion of the positive temperature coefficient layer 38 to form a topcoat layer 42. The topcoat layer may cover the entire positive temperature coefficient layer 38 or a portion of the positive temperature coefficient layer 38. The topcoat layer 42 may be the outermost coating layer of the component 42. The topcoat layer 42 may be positioned over and in direct contact with the positive temperature coefficient layer 38.

With continued reference to FIG. 4, it will be appreciated that the order of layers shown in FIG. 4 may be altered, such as the order of the conductive ink 36 and the positive temperature coefficient layer 38. For example, the positive temperature coefficient layer 38 may be arranged over the substrate 32 with the conductive ink 36 arranged over the positive temperature coefficient layer 38 and with the topcoat layer 42 arranged over the conductive ink 36.

Figure 5:
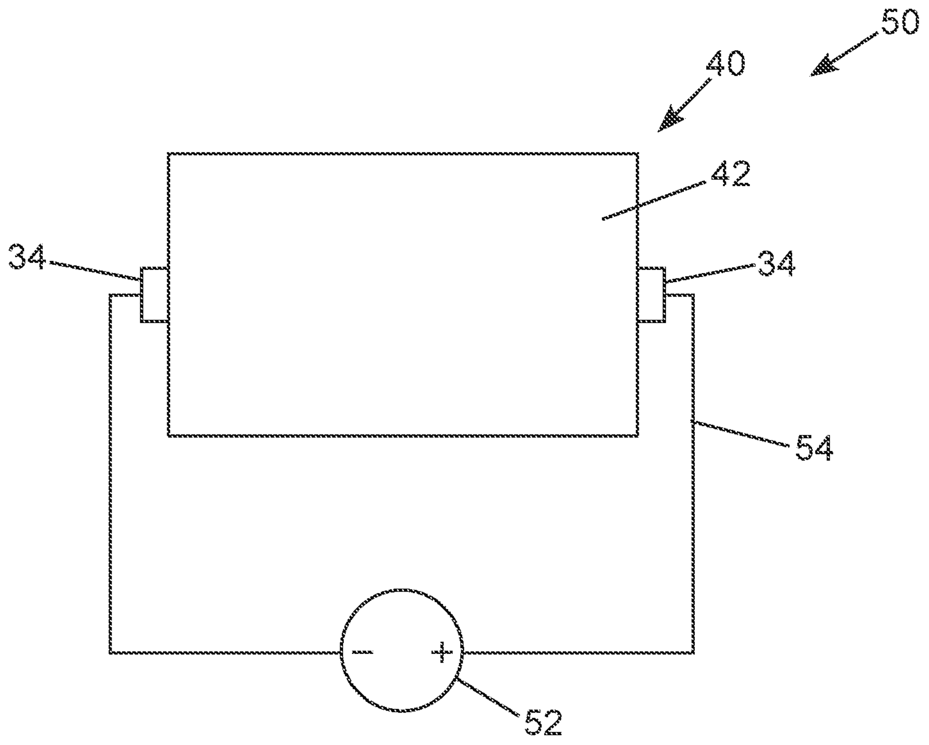
FIG. 5 shows a schematic top view of a positive temperature coefficient system including a positive temperature coefficient component including a topcoat layer, the positive temperature coefficient component in electrical communication with a voltage source.

Referring to FIG. 5, a positive temperature coefficient system 50 is shown. The system 50 may include the component 40 (such as any of the previously described positive temperature coefficient components). The component 40 may include the topcoat layer 42 as an outermost layer thereover. The system 50 may include a power source 52 in electrical communication with the electrodes 34. The power source 52 may be in electrical communication with the electrodes 34 and/or the positive temperature coefficient layer (not shown in FIG. 5) by wires 54 or other suitable conductive material to flow current from the power source 52 to the component 40.

A method for self-regulating a temperature of a component may include causing an electrical current to be applied to the positive temperature coefficient component. The current may be caused to flow through (be applied) the positive temperature coefficient layer of the component by, for example, a user activating a voltage source in electrical communication with the positive temperature coefficient layer and/or a computer controlled by a processor activating the voltage source, and the current through the positive temperature coefficient layer may be automatically stopped above the trip temperature associated with the positive temperature coefficient layer. The conductive composition may be applied onto the substrate and/or the conductive ink of the component by screen printing or other suitable application technique, such as rotogravure printing, flexographic printing, inkjet printing, or syringe dispensing. The topcoat composition may be screen printed over at least a portion of the substrate, the conductive ink, and/or the positive temperature coefficient layer to form the topcoat layer. The topcoat composition may be applied by electrocoating, spraying, electrostatic spraying, dipping, rolling, brushing, and the like to form the topcoat layer.

A method of preparing a positive temperature coefficient component may include applying the conductive ink over at least a portion of the substrate. The conductive composition may be applied over at least a portion of the substrate and/or the conductive ink to form the positive temperature coefficient layer. The topcoat composition may be applied over at least a portion of the substrate and/or the conductive ink and/or the positive temperature coefficient layer to form the topcoat layer. The topcoat composition may be coalesced to form the topcoat layer using heat or at ambient temperature (20° C.-25° C.). The topcoat composition may be coalesced to form the topcoat layer by applying UV radiation to the topcoat composition. The UV radiation may be applied at an energy density as previously described herein.

EXAMPLES

The following examples are presented to demonstrate the general principles of the invention. The invention should not be considered as limited to the specific examples presented.

Example 1

Preparation of a Polyester Polymer

A polyester polymer was prepared by adding 158.0 grams of octadecanedioic acid dimethyl ester (available from Elevance Renewable Sciences (Woodbridge, IL)), 56.27 grams of 1,2-propylene glycol, and 0.9 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 30 grams of methanol had been collected. The final resin solution had a measured percent solids (110° C./1 hour), as described in ASTM D2369, of about 100%, and a hydroxyl value of 40.0 mg KOH/g, determined by ASTM D4274. Gel permeation chromatography was used with tetrahydrofuran solvent and polystyrene standards to determine a weight average molecular weight (Mw) of 6033 g/mol. Mw and/or Mn, as reported herein, was measured, unless otherwise indicated, by gel permeation chromatography using a polystyrene standard according to ASTM D6579-11 (performed using a WATERS® 2695 separation module with a WATERS® 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da).

Examples 2-6

Preparation of Positive Temperature Coefficient (PTC) Components

A silver ink was printed utilizing an 80 durometer hand squeegee on a polyester screen. The silver ink was dried at 145° C. for 10 minutes. Positive temperature coefficient (PTC) compositions prepared according to Table 1 were printed over top of the silver traces utilizing an 80 durometer hand squeegee.

TABLE 1

| | Ex. 2 | Ex. 3 | Ex. 4 | Ex. 5 | Ex. 6 |
|---|---|---|---|---|---|
| EXXON MOBIL ™ AROMATIC 200[1] | 7.4 | 7.69 | 7.40 | 9.84 | 7.40 |
| Diacetone Alcohol | 4.86 | 5.05 | 4.86 | 6.46 | 4.86 |
| Polymer A[2] | 3.20 | — | — | — | — |
| DYNACOLL ® 7381[3] | — | 5.45 | — | — | — |
| PEARLBOND ™ 223[4] | — | — | — | — | 3.20 |
| POLYWAX ™ M70[5] | — | — | 3.20 | — | — |
| HONEYWELL A-C ® 597A[6] | — | — | — | 4.39 | — |
| MONARCH ® 120[7] | 2.68 | 4.56 | 2.68 | 3.68 | 2.68 |
| VULCAN ® XC 72 R[8] | 0.12 | 0.20 | 0.12 | 0.16 | 0.12 |

[1]solvent commercially available from Exxon Mobile Chemical (Houston, TX)
[2]polyester polymer from Example 1 having a melting endotherm of 59° C.
[3]solid, highly crystalline, saturated polyester having a melting endotherm of 65° C. commercially available from Evonik Industries (Essen, Germany)
[4]linear, polycaprolactone-based polyurethane having a melting endotherm of from 64° C.-68° C. commercially available from Lubrizol Corporation (Wickliffe, OH)
[5]polyethylene wax having a melting endotherm of 69° C. commercially available from Baker Hughes (Houston, TX)
[6]a propylene maleic anhydride copolymer having a melting endotherm of from 142° C.-152° C. commercially available from Honeywell International Inc. (Charlotte, NC)
[7]carbon black commercially available from Cabot Corporation (Boston, MA)
[8]carbon black commercially available from Cabot Corporation (Boston, MA)

The PTC compositions were dried at 145° C. for 5 minutes. The circuit was allowed to relax for 24 hours and a FLUKE® 189 multimeter was used to determine the point to point loop resistance of the circuit. The average of 3 point to point loop resistances was recorded (see Avg. Bare, Tables 2 & 3)

A. PTC Components Coated with a (Meth)Acrylic Dielectric Material

A dielectric liquid coating composition including a UV curable (meth)acrylic material was then applied using an 80 durometer squeegee on a polyester screen and cured at 500 mJ/cm2. An EIT Power Puck® II was used to determine the energy density of the UV lamp. Once the energy density was stabilized the coated circuit was placed in the UV oven. The dielectric was allowed to relax for 24 hours after UV cure was initiated and 3 point to point loop resistances were recorded and the average thereof determined (see Table 2).

TABLE 2

| | Ex. 2 | Ex. 3 | Ex. 4 | Ex. 5 |
|---|---|---|---|---|
| Avg. Bare (Ω) | 56.8 | 48.3 | 167.1 | 81.8 |
| Avg. 24 hours (Ω) | 82.2 | 81.9 | 140.9 | 45.1 |
| Δ % | 44.7 | 69.6 | 15.7 | 44.9 |

B. PTC Components Coated with a Polyurea-Polyurethane Dielectric Material

A dielectric liquid coating composition including a polyurea-polyurethane co-block polymer dispersion material in water (VIVAFLEX® commercially available from PPG Industries Inc. (Pittsburgh, PA)) was then applied over circuits as described above and allowed to cure at ambient conditions for 24 hours before 3 point to point loop resistances were recorded and the average thereof determined (see Table 3).

TABLE 3

| | Ex. 2 | Ex. 3 | Ex. 4 | Ex. 5 | Ex. 6 |
|---|---|---|---|---|---|
| Avg. Bare (Ω) | 57.3 | 40.7 | 173.1 | 102.0 | 187.6 |
| Avg. 24 hours (Ω) | 57.0 | 40.9 | 172.8 | 102.0 | 188.4 |
| Δ % | 0.5 | 0.5 | 0.2 | 0 | 0.4 |

Tables 2 and 3 show that examples 2-5 of the (meth) acrylic dielectric material and examples 2-6 of the polyurea-polyurethane dielectric material exhibit a 24-hour loop resistance of the positive temperature coefficient component that is less than 100% higher than the loop resistance of the same positive temperature coefficient component except not including the topcoat layer, illustrating the dielectric materials' suitability for use as topcoats in a positive temperature coefficient component.

Whereas particular embodiments of this invention have been described above for purposes of illustration, it will be evident to those skilled in the art that numerous variations of the details of the present invention may be made without departing from the invention as defined in the appended claims.

The invention claimed is:

1. A positive temperature coefficient component, comprising:
- a substrate;
- a conductive ink disposed over at least a portion of the substrate;
- a positive temperature coefficient layer disposed over at least a portion of the substrate and/or the conductive ink; wherein the positive temperature coefficient layer is formed from a conductive composition comprising a non-conductive material and conductive particles dispersed in the non-conductive material, and wherein the non-conductive material comprises: (a) a polyester polymer having a backbone comprising at least 12 consecutive carbon atoms between ester linkages, or (b) a wax; and
- a topcoat layer formed from a coating composition comprising a dielectric material disposed over at least a portion of the positive temperature coefficient layer and/or the conductive ink.

2. The positive temperature coefficient component of claim 1, wherein the dielectric material comprises a UV curable (meth)acrylate material, a polyurea polymer and/or a polyurethane polymer.

3. The positive temperature coefficient component of claim 1, wherein the non-conductive material comprises the polyester polymer (a), which in turn comprises a first polyester polymer having a backbone comprising at least 12 consecutive carbon atoms between ester linkages and a second polyester polymer having a backbone comprising at least 12 consecutive carbon atoms between ester linkages, wherein the first polyester polymer is different from the second polyester polymer.

4. The positive temperature coefficient component of claim 1, wherein the conductive particles comprise conductive carbon.

5. The positive temperature coefficient component of claim 1, further comprising two electrodes in electrical communication with the positive temperature coefficient layer.

6. The positive temperature coefficient component of claim 1, wherein the positive temperature coefficient component comprises a heating element or an overcurrent protection element.

7. The positive temperature coefficient component of claim 6, wherein the heating element or overcurrent protection element comprises a vehicle component, an architectural component, clothing, a mattress, a sealant, a battery enclosure, a medical component, a heating pad, a fabric, and/or an electrical component.

8. The positive temperature coefficient component of claim 1, wherein the topcoat layer exhibits a dielectric breakdown of at least 1.4 kV, as determined according to ASTM D149.

9. The positive temperature coefficient component of claim 1, wherein the topcoat composition comprises a (meth)acrylic material, polyurea material, and/or a polyurethane material.

10. The positive temperature coefficient component of claim 1, wherein the coating composition is UV curable at an energy density of from 200 $mJ/cm^2$ to 800 $mJ/cm^2$.

11. The positive temperature coefficient component of claim 1, wherein the positive temperature coefficient layer exhibits a trip temperature in a range from 20° C. and 160° C., wherein the trip temperature is a temperature at which a maximum slope is exhibited in a graph of normalized resistance over temperature for the positive temperature coefficient layer.

12. The positive temperature coefficient component of claim 1, wherein a 24-hour loop resistance of the positive temperature coefficient component is less than 100% higher than the loop resistance of the same positive temperature coefficient component except not including the topcoat layer.

13. A method for self-regulating a temperature of a component, comprising:
- causing an electrical current to be applied to a positive temperature coefficient component comprising:
- a substrate;
- a conductive ink disposed over at least a portion of the substrate;
- a positive temperature coefficient layer disposed over at least a portion of the substrate and/or the conductive ink; wherein the positive temperature coefficient layer is formed from a conductive composition comprising a non-conductive material and conductive particles dispersed in the non-conductive material, and wherein the non-conductive material comprises: (a) a polyester polymer having a backbone comprising at least 12 consecutive carbon atoms between ester linkages, or (b) a wax; and
- a topcoat layer formed from a coating composition comprising a dielectric material disposed over at least a portion of the positive temperature coefficient layer and/or the conductive ink.

14. The method of claim 13, wherein the current is flowed through the positive temperature coefficient layer and is automatically stopped above a trip temperature associated with the positive temperature coefficient layer.

15. The method of claim 13, wherein the coating composition is UV curable at an energy density of from 200 $mJ/cm^2$ to 800 $mJ/cm^2$.

16. A method of preparing a positive temperature coefficient component, comprising:
- applying a coating composition comprising a dielectric material over at least a portion of a coated substrate to form a topcoat layer, the coated substrate comprising:
- a conductive ink disposed over at least a portion of a substrate; and
- a positive temperature coefficient layer disposed over at least a portion of the substrate and/or the conductive ink; wherein the positive temperature coefficient layer is formed from a conductive composition comprising a non-conductive material and conductive particles dispersed in the non-conductive material, and wherein the non-conductive material comprises: (a) a polyester polymer having a backbone comprising at least 12 consecutive carbon atoms between ester linkages, or (b) a wax.

17. The method of claim 16, wherein the coating composition is applied over at least a portion of the positive temperature coefficient layer.

* * * * *